Jan. 29, 1952   B. S. CAIN   2,583,765
BRAKE RIGGING DEVICE
Filed Sept. 5, 1946

Inventor:
Basil S. Cain,
by Prowell S. Mack
His Attorney.

Patented Jan. 29, 1952

2,583,765

UNITED STATES PATENT OFFICE 2,583,765

BRAKE RIGGING DEVICE

Basil S. Cain, Erie, Pa., assignor to General Electric Company, a corporation of New York Application September 5, 1946, Serial No. 694,977

7 Claims. (Cl. 188—46)

My invention relates to improvements in brake riggings for railway and similar traction vehicles and particularly to a device for improving the arrangement of an equalizing hand brake beam for use in such brake riggings.

An object of my invention is to provide an improved brake rigging device.

Another object of my invention is to provide an improved brake rigging utilizing an equalizing brake beam to facilitate movement of such a brake beam for repairs of equipment adjacent the brake beam and to provide a desired guiding of such a brake beam relative to the truck to which the brake rigging is applied.

Further objects and advantages of my invention will become apparent and my invention will be better understood from the following description referring to the accompanying drawing, and the features of novelty which characterize my invention will be pointed out with particularity in the claims annexed to and forming a part of this specification.

Figure 1:
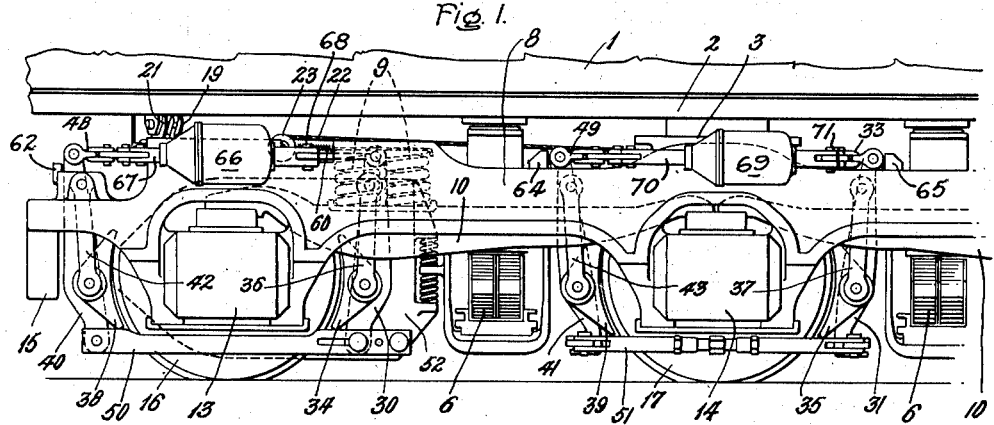
Figure 2:
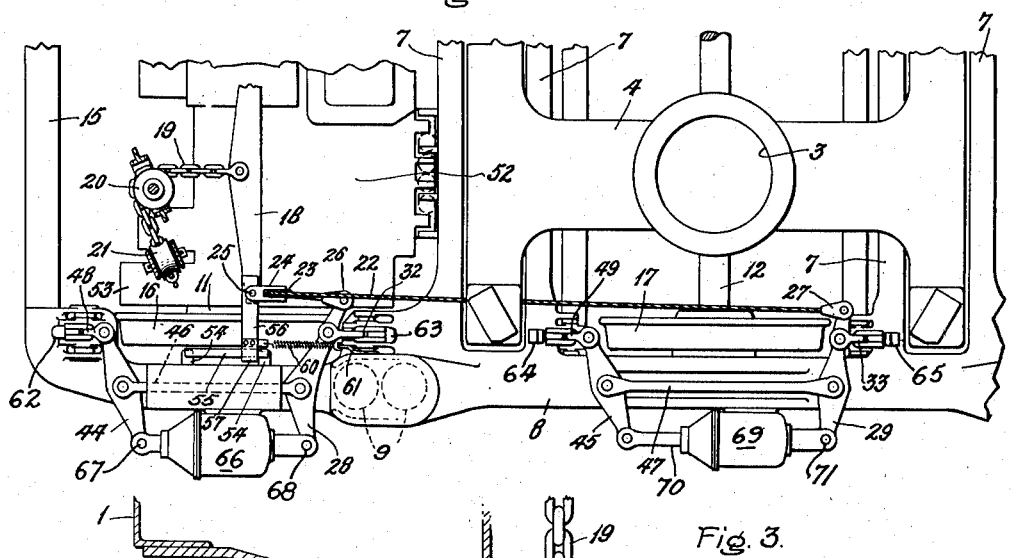
Figure 3:
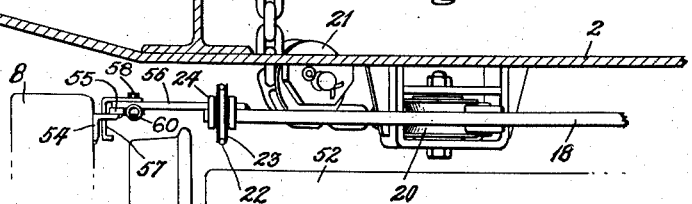
Figure 4:
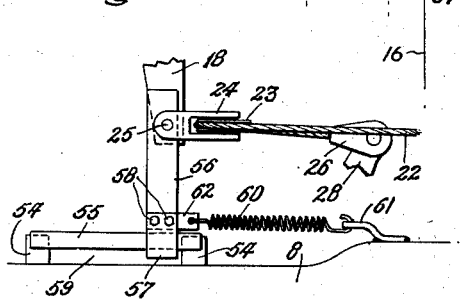

In the drawing, Fig. 1 is a side elevational view of a part of a railway truck to which an embodiment of my improved brake rigging is applied; Fig. 2 is a partial plan view of the construction shown in Fig. 1; Fig. 3 is an end view of a part of the truck and brake rigging shown in Figs. 1 and 2 particularly illustrating an embodiment of my improved brake beam as shown in these two figures; and Fig. 4 is an enlarged plan view of the improved brake rigging device shown in Figs. 1, 2, and 3 utilizing an embodiment of my invention.

Referring to the drawing, I have shown an embodiment of my invention applied to a hand brake rigging for a railway truck adapted to support a railway car having a superstructure 1 mounted on a frame 2 which is supported on a truck by a center bearing 3 mounted on a suitable bolster 4 which is resiliently supported by springs 6 mounted on the truck frame. This truck frame includes transoms 7 connected to side frames 8 which are supported by sets of coil springs 9 mounted on longitudinal equalizers 10 which extend between the driving axle 11 at each end of the truck and a central axle 12. These equalizers 10 are adapted to transfer the load of the truck to the axles by being mounted directly above the journal boxes 13 and 14, respectively, of the axles 11 and 12, and the entire construction is maintained in more rigid alignment by the provision of truck end frames 15 at each end connecting together the ends of the truck side frames 8. The truck illustrated in the drawings is a three-axle truck, two axles of which are shown in the figure, but my invention could be used in connection with a truck having any desired number of axles. The third axle at the right-hand end of the truck, not shown in the drawing, is the same as the parts shown in the left-hand side of the drawing and has been omitted in order to permit a larger illustration of the arrangement of the improved brake rigging. In this construction, the hand brake rigging is applied only to the leading driving axle wheels 16 and the middle axle wheel 17 and comprises an equalizing brake beam 18 which extends transversely of the truck and is connected in any suitable manner, as by an operating chain 19 which extends around pulleys 20 and 21 mounted on the car underframe 2 and secured to any suitable operating wheel or handle for operatively moving the hand brake beam for application of a braking force to the brake rigging. This braking force is adapted to be transmitted from the equalizing hand brake beam 18 to clasp brakes arranged on both sides of the wheels 16 and 17 through a pair of equalizing cable connections, each of which includes a cable 22 which passes around a pulley 23 rotatably mounted on a bracket 24 by a pin 25 to each end of the hand brake beam 18. This brake cable 22 is pivotally secured by clevises 26 and 27 to the ends of brake levers 28 and 29 which are operatively connected to levers 30 and 31 through links 32 and 33, respectively, for transmittal of braking forces to these brake levers, to which brake shoes 34 and 35 are pivotally connected. This brake rigging may be of any suitable design and, in the illustrated arrangement, includes hangers 36 and 37 which pivotally support the brake shoes 34 and 35, respectively, by being connected to the side frames 8 of the truck and also includes brake shoes 38 and 39 which are operatively connected to brake levers 40 and 41 and are supported on the truck side frames 8 by hangers 42 and 43, respectively. The brake shoes 38 and 39 are adapted to be operated by a linkage which includes brake levers 44 and 45 which are operatively connected to the brake levers 28 and 29, respectively, by brake rods 46 and 47 and to the brake levers 40 and 41 by links 48 and 49, respectively. Brake lever stops 62, 63, 64 and 65 are formed on the side frames 8 to limit the movement of brake levers 40, 30, 41 and 31, respectively. Air cylinder 66 actuates the brake rigging associated with wheel 16 and is provided with a movable piston 67 to which brake lever 44 is connected and a fixed pivot 68 at the other end thereof to which brake lever 28 is connected. Air cylinder 69 operates the brake rigging associated with wheel 17 and is provided with movable piston 70 and fixed pivot 71. The proper operation of these clasp brakes on both sides of the wheels is assured by this interconnected linkage of brake levers and rods, together with brake rods 50 and 51 which interconnect the ends of the brake levers 30 and 40 and 31 and 41, respectively.

Under power application of the brakes, considering wheel 16 as an example, the functioning of the brake rigging associated with wheel 17 being identical, initial movement of the piston 67 to the left responsive to air application as viewed in Figs. 1 and 2, causes brake lever 44 to pivot about brake rod 46 so that link 48 moves the brake lever 40 to the right to initially apply brake shoe 38. As soon as brake shoe 38 has touched the rim of the wheel 16, it becomes a pivot and further movement of the piston 67 to the left responsive to application of air causes brake lever 40 to pivot around the brake shoe 38 moving brake lever 50 to the left. This motion of the brake lever 50 in turn produces a leftward movement of the brake lever 30 applying the brake shoe 34. After the brake shoe 34 has been applied, further motion of the piston 67 to the left produces a clamping action of the brake levers 40 and 30 producing the clasping action of the brake shoes 38 and 34 on the rim of the wheel 16.

Under hand application of the brakes responsive to leftward movement of the brake beam 18, brake lever 28 is moved to the left around fixed pivot 68 moving brake rod 46 and brake lever 44 to the left. The leftward force exerted on the brake lever 44 by the brake rod 46 causes the brake lever 44 to exert a rightward force on the piston 67. However, since no air has been applied to the air cylinder 66, the piston 67 is in its extreme inward position and, therefore, the brake lever 44 pivots to the left on the piston 67. The leftward motion of the brake lever 28 has also produced a leftward motion of link 32 causing brake lever 30 to pivot around a moving pivot provided by the brake shoe 34 and the brake hanger 36, thus moving brake rod 50 to the right. The leftward motion of brake lever 44 and its associated link 48 and the rightward motion of the brake rod 50 causes brake lever 40 to pivot around a moving pivot provided by the brake shoe 38 and brake hanger 42 and thus initially applies the brake shoe 38. Continued leftward motion of brake lever 28 responsive to the pull from the cable 22 and the brake beam 18 causes brake rod 46, brake lever 44 and link 48 to push brake lever 40 further to the left to engage stop 62. Since the relative position of the brake lever 40 is now substantially fixed, further leftward movement of the brake lever 28, producing a leftward movement of link 32, causes brake lever 30 to pivot on brake rod 50 and to move to the left to apply the brake shoe 34. This further leftward movement of the brake lever 28 after the brake lever 40 has reached the stop 62, produces a further leftward movement of brake rod 46 which now pivots on link 48 moving piston 67 to the left against the spring in the brake cylinder 66 which is provided to release the brakes after air application, however, after brake lever 40 has engaged stop 62, further motion of the brake lever 44 responsive to leftward motion of brake rod 46 has no effect on the functioning of the remaining components of the linkage. After brake shoes 38 and 34 have been initially applied, as described above, further leftward movement of the brake lever 28 produces a clamping action between brake levers 40 and 30 providing the clasping action of the brake shoes 38 and 34.

As shown in the drawing, the equalizing hand brake beam 18 extends transversely over an electric driving motor 52 and its associated gear box 53 which makes it somewhat difficult to adjust or repair these parts of the driving gear for the truck without removal of the hand brake equalizing beam 18 from its normal position. Furthermore, as shown in this construction, the hand brake beam is of the floating type which might tend to shift unduly transversely of the truck under certain operating conditions and thereby might cause operation of the brakes when this is not desired or might cause an uneven application of braking forces to the two sides of the truck. In order to facilitate repairs of the parts adjacent the hand brake beam 18 and minimize any undue movement of the brake beams transversely of the truck while permitting a predetermined free longitudinal movement of this brake beam to provide for satisfactory operation of the brakes when desired, a brake beam guide is arranged on each side of the truck which includes a guiding bar member formed of two supporting angle irons 54 with a longitudinally extending bar 55 secured thereto forming a longitudinally extending guide slot on each side of the truck. The guiding bar member 55 extends longitudinally of the truck in the direction of the operative movement of the hand brake beam 18 and is adapted to cooperate with a retaining guide member 56 on each end of the brake beam to provide the desired guiding and support of brake beams. This retaining guide member is provided with a hooked end 57 which may be formed integral therewith or may be bolted thereto in any suitable manner, as by a plurality of bolts 58 and is operatively connected to the adjacent guide bar 55 by extending around this guide bar 55 through the longitudinal slot 59 formed between the guide bar 55 and the truck side frame 8 in such a position as to permit a limited amount of transverse movement of the brake beam relative to the truck frame, but to limit such movement to a predetermined safe value. Furthermore, the retaining guide member 56 is adapted to rest on the guide bar 55 and provide a certain amount of vertical support for the brake beam 18, while the hooked end 57 of the retaining guide member is formed of such a length as to provide for a predetermined vertical movement of the brake beam and is formed with the end thereof extending transversely of the guide bar for preventing accidental disconnection between the retaining guide member and the guide bar 55 and providing for a predetermined vertical movement of the brake beam 18 to allow for a desirable lifting of this brake beam to facilitate repairs of the adjacent motor, gear, or other truck members.

In the drawing, only one side of this construction of the brake rigging device is shown in order to enable the illustration of these features as clearly as possible, and both sides are formed in the same manner to provide an equalized brake rigging which is adapted to cooperate with the truck wheels for providing equalized braking forces to the wheels on which the hand brake rigging is operable. In such a construction, it is desirable that the hand brake beam 18 should be returned to its released brake position whenever the brake operating mechanism is released, and also it is desirable that both ends of the brake beam 18 should remain substantially in the same longitudinal position relative to the truck frame. This desirable motion of the hand brake beam 18 is obtained by the provision of a resilient biasing spring 60 which is connected to a bracket 61 on the side frame 8 adjacent the guide bar 55 and also connected to a bracket 62 on the retaining guide member 56 at each end of the brake beam 18 to provide for biasing the brake beam to its released brake position towards the center of the truck.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. In a brake rigging for wheels of a car truck, an equalizing brake beam, means for operatively moving said brake beam for application of a braking force to said brake rigging, a plurality of connected brake levers and rods carried by said truck, brake shoes carried by said brake levers adapted to cooperate with said wheels to provide a braking force thereto, means for resiliently biasing said brake beam to a released brake position, a brake beam guide including a guiding bar member with a longitudinally extending slot therein on each side of said truck and extending longitudinally of said truck in the direction of operative movement of said brake beam, and means including a retaining guide member on each end of said brake beam having a hooked end operatively connected to the adjacent one of said guiding bars and extending into the associated guide slot for restraining said brake beam against undue movement transversely of said truck and providing for predetermined longitudinal movement of said brake beam, said hooked end of each of said retaining guide members having such length as to provide for predetermined vertical movement of said brake beam and having the end thereof extending transversely of said guiding bar for preventing accidental disconnection of said connection with said guiding bar.

2. In a car truck, a truck frame, a pair of wheels therefor, brake rigging for each of said wheels including brake levers, power means on said truck operatively connected to said levers to provide power application of said brake rigging, an equalizing beam operatively connected to said levers, means responsive to manual operation for moving said beam to provide hand application of said brake rigging, a guiding member longitudinally arranged on each side of said truck and spaced therefrom, and retaining members on each end of said beam slidingly engaging said guiding members and having hooked portions respectively extending through the space between said frame and said guiding members for restraining said beam against transverse motion and for guiding the longitudinal motion thereof, the ends of said hooked portions being spaced from said retaining members to provide a predetermined vertical movement of said beam.

3. In a car truck, a truck frame, a pair of wheels therefor, brake rigging for each of said wheels including a brake lever and a cylinder lever operatively connected thereto, brake cylinders mounted on said frame and respectively connected to said cylinder levers to provide power application of said brake rigging, an equalizing beam operatively connected to said cylinder levers, means responsive to manual operation for moving said beam to provide hand application of said brake rigging, a guiding member longitudinally arranged on each side of said truck and spaced therefrom, and retaining members on each end of said beam slidingly engaging said guiding members and having hooked portions respectively extending through the space between said frame and said guiding members for restraining said beam against said transverse motion and for guiding the longitudinal motion thereof, the ends of said hooked portions being spaced from said retaining members to provide a predetermined vertical movement of said beam.

4. In a car truck, a truck frame, a plurality of pairs of wheels therefor, a brake rigging for each of said wheels including a brake lever and a cylinder lever operatively connected thereto, brake cylinders mounted on said frame and respectively connected to said cylinder levers to provide power application of said brake rigging, an equalizing beam extending across said frame and having a pulley secured adjacent each end thereof, said beam being operatively connected to said cylinder levers by cables respectively connected to said cylinder levers and passing over said pulleys, means responsive to manual operation for moving said beam to provide hand application of said brake rigging, a guiding member longitudinally arranged on each side of said truck and spaced therefrom, and retaining members on each end of said beam slidingly engaging said guiding members and having hooked portions respectively extending through the space between said frame and said guiding member for restraining said beam against transverse motion and for guiding the longitudinal motion thereof, the ends of said hooked portions being spaced from said retaining members to provide a predetermined vertical movement of said beam.

5. In a car truck, a truck frame, a pair of wheels therefor, brake rigging for each of said wheels including brake levers, power means on said truck operatively connected to said levers to provide power application of said brake rigging, an equalizing beam operatively connected to said levers, means responsive to manual operation for moving said beam to provide hand application of said brake rigging, means for resiliently biasing said beam to a released brake position, a guiding member longitudinally arranged on each side of said truck and spaced therefrom, and retaining members on each end of said beam slidingly engaging said guiding members and having hooked portions respectively extending through the space between said frame and said guiding members for restraining said beam against transverse motion and for guiding the longitudinal motion thereof, the ends of said hooked portions being spaced from said retaining members to provide a predetermined vertical movement of said beam.

6. In a brake rigging for the wheels of a car truck, brake levers for applying brakes to said wheels, an equalizing beam operatively connected to said levers, means for moving said lever to apply said brake rigging, a guide member longitudinally arranged on each side of said truck and spaced therefrom, and retaining members on each end of said beam slidingly engaging said guide members and having hooked portions respectively extending through the space between said truck and said guide member for restraining said beam against transverse motion and for guiding the longitudinal motion thereof, the ends of said hooked portions being spaced from said retaining members to provide a predetermined vertical movement of said beam.

7. In a brake rigging for the wheels of a car truck, brake levers for applying brakes to said wheels, an equalizing beam operatively connected to said levers, means for moving said beam to apply said brake rigging, means for resiliently biasing said beam to a released brake position, a guide member longitudinally arranged on each side of said truck and spaced therefrom, and retaining members on each end of said beam slidingly engaging said guide members and having hooked portions respectively extending through the space between said truck and said guide members for restraining said beam against transverse motion and for guiding the longitudinal motion thereof, the ends of said hooked portions being spaced from said retaining members to provide a predetermined vertical movement of said beam.

BASIL S. CAIN.

REFERENCES CITED

The following references are of record in the file of this patent:

UNITED STATES PATENTS

| Number | Name | Date |
| --- | --- | --- |
| 1,969,114 | Baselt | Aug. 7, 1934 |
| 2,383,955 | Busse | Sept. 4, 1945 |